Jan. 27, 1959 T. F. SARAH 2,870,977
STRAND END ATTACHER FOR A SPINNING REEL
Original Filed March 1, 1954
2 Sheets-Sheet 1
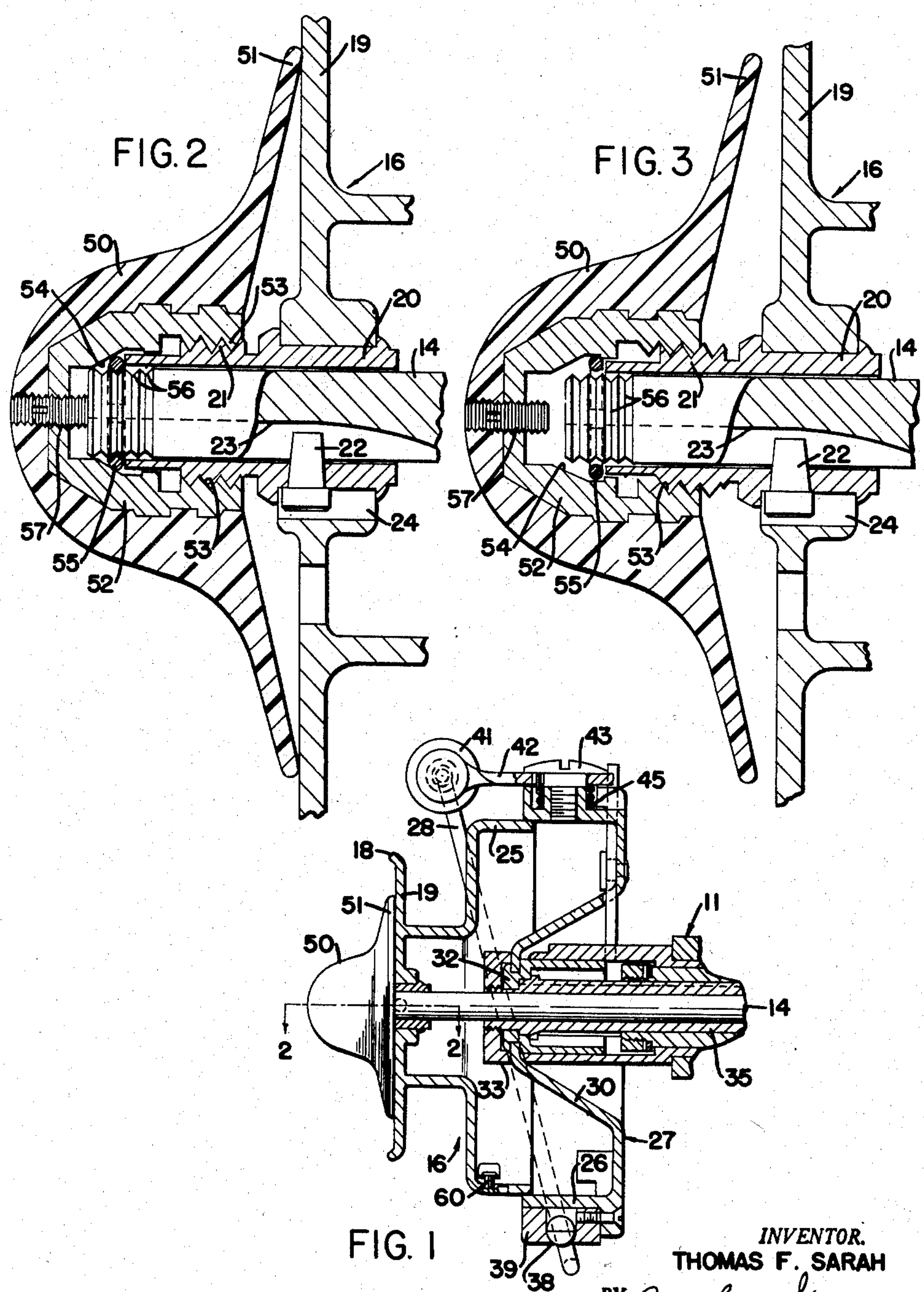
INVENTOR.
THOMAS F. SARAH
BY Ely, Frye & Hamilton
ATTORNEYS

STRAND END ATTACHER FOR A SPINNING REEL

Original Filed March 1, 1954

*INVENTOR.*
THOMAS F. SARAH
*BY* Ely, Frye & Hamilton
ATTORNEYS

United States Patent Office 2,870,977
Patented Jan. 27, 1959

2,870,977

STRAND END ATTACHER FOR A SPINNING REEL

Thomas F. Sarah, Akron, Ohio, assignor to The Enterprise Manufacturing Company, Akron, Ohio, a corporation of Ohio Original application March 1, 1954, Serial No. 412,988, now Patent No. 2,755,037, dated July 17, 1956. Divided and this application February 28, 1956, Serial No. 572,185

4 Claims. (Cl. 242—125.2)

The invention relates generally to spinning reels used in fishing, and more particularly to improvements in the spool on which the fishing line is wound. This application is a division of my copending application Serial No. 412,988, filed March 1, 1954, now patent No. 2,755,037.

In using spinning reels, it is highly desirable to employ several spools having lines of different weight wound thereon, and to change spools to suit different conditions. The reel should be constructed so that the spools can be changed quickly and easily. When a spool is being changed or is not in use, provision should be made to prevent the line from unwinding from the spool, especially since the nylon type of line which is currently popular has added resiliency which increases its tendency to unwind.

Prior devices for holding the line from unwinding have been inconvenient and awkward to use, and cause undue wear on the line.

It is an object of the present invention to provide a novel line fastening device on the spool which is easily operated to hold the line from unwinding at any time, as when the spool is removed from the reel or when the reel including the spool is removed from the rod on which it is mounted.

This and other objects are accomplished by the improvements comprising the present invention, a preferred embodiment of which is illustrated by way of example in the accompanying drawing and described in detail in the following specification. Various modifications and changes in details of construction are intended to be within the scope of the invention as defined in the appended claims.

Referring to the drawings:

Fig. 1 is a fragmentary sectional view of a spinning reel embodying the improved spool construction;

Fig. 2 is an enlarged fragmentary sectional view showing the spool held on the shaft by a novel quick release nut;

Fig. 3 is a similar view with the nut in released position;

Figure 4:
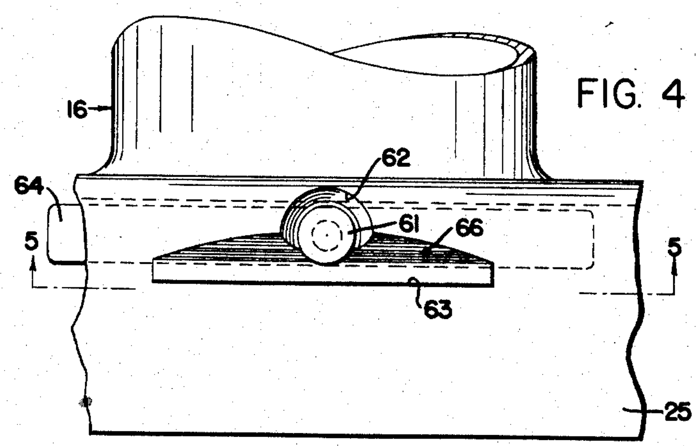
Fig. 4 is an enlarged fragmentary elevation looking toward the rim of the spool.
Figure 5:
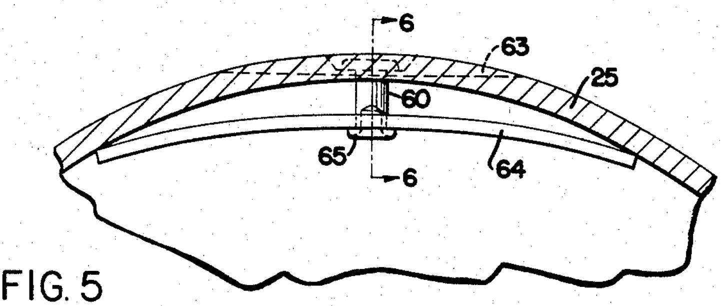
Fig. 5 is a sectional view on line 5—5, Figs. 4 and 6.

The type of reel shown in Fig. 1 is disclosed in my application Serial No. 371,385, filed July 30, 1953 and entitled Spinning Reel, now Patent No. 2,713,463. As disclosed in said application, the reel has a spool shaft 14 which carries the spool 16 having an inner skirt flange 25 which is telescopically received within the outer annular flange 26 of a carrier or flyer 27 which carries the pick-up arm or bale 28. The carrier 27 preferably has a re-entrant conical base 30 which is seated in a bushing 32, and the bushing is secured by a nut 33 on the front end of a tubular drive shaft 35 which is rotatable and slidable on spool shaft 14.

The real housing shown fragmentarily at 11 is also carried on the spool shaft 14, and suitable means (not shown) are provided in the reel housing for driving the tubular shaft 35 to rotate the carrier 27.

Means are also provided to reciprocate the carrier as it rotates to level wind the line on the spool. The carrier mounts the pick-up arm or loop 28, one end of which has a ball joint 38 universally mounted in a socket member 39 on the carrier. The other end of loop 28 is connected to a line guide bracket 41 mounted on a pivot arm 42 journaled on the shank of a pivot screw 43 around which is mounted a torsion spring 45 urging the arm 28 to its line guiding position shown in Fig. 1. The bracket 41 is preferably provided with a suitable roller over which the line passes to the spool.

In the casting position the arm 28 is swung through 180° to an out-of-the-way position, so that as the line is cast the line peels off the stationary spool over the curved lip 18 of its front flange 19, and when crank handle of the reel is turned to wind in the line, the spring 45 snaps the arm 28 to the position of Fig. 1 where it engages the incoming line and guides it onto the roller in the line guide bracket 41.

The front flange 19 of the spool is preferably mounted at its central portion on a hub bushing 20 which extends forwardly around the shaft 14 and has an external threaded portion 21 between its outer end and the spool flange 19. A pin 22 keys or splines the spool to the shaft, the shank of the pin extending into a keyway 23 in shaft 14 and the head of the pin extending into a slot 24 in the hub of the spool.

A quick release nut 50 is provided for securing the spool on shaft 14 in adjusted position relative to the line guide bracket 41. The nut 50 is preferably made of a plastic material and has a skirt flange 51 which resiliently engages the front flange 19 of the spool, as shown in Fig. 1. Preferably, the nut 50 has a metal insert bushing 52 molded therein which has an internal thread 53 screwed on the portion 21 of bushing 20. The insert bushing 52 is cup-shaped and its base has a tapered annular surface 54 normally positioned at the outer end of bushing 21.

A split snap ring 55 is located within the surface 54 and has a diameter such that when released the ring will occupy the annular space within the insert bushing 52 at the large end of the surface 54, in which position the ring does not engage the spool shaft 14, as shown in Fig. 3. When the nut 50 is screwed inwardly on the bushing 20, the tapered surface 54 abuts and compresses the ring 55 to cause it to engage the shaft 14. A series of annular grooves 56 is provided on the end of the shaft to retain the ring selectively in several positions along the shaft, and a set screw 57 screwed through the end of the nut and bushing 52 abuts the end of the shaft to return the spool to the same adjusted position relative to the line guide bracket 41.

When the spool 16 is mounted on the shaft 14 as shown in Fig. 1, the nut 50 is screwed on the bushing 20 with the skirt flange 51 resiliently engaging the front flange 19 and the tapered surface 54 compressing the ring 55 into engagement with one of the grooves 56, so that withdrawal of the spool is prevented by engagement of the end of bushing 20 with the ring. The set screw is screwed in to abut the end of shaft 14. When it is desired to remove the spool one full turn of the nut allows the ring 55 to expand into the annular space at the large end of the tapered surface 54, as shown in Fig. 3, and the spool with nut 50 still attached to bushing 20 can be removed bodily from the shaft.

To replace the spool 16 it is only necessary to enter the shank of pin 22 into the keyway in shaft 14 and slide the bushing 20 and the nut 50 affixed thereto over the shaft until the spool reaches the desired position, whereupon one full term of the nut 50 will compress the ring into a groove 56, and bring the set screw into abutment with the end of shaft 14 to again locate the spool in the same position relative to the line guide bracket 41. To adjust the position of the spool on the shaft, the set screw 57 is partly unscrewed and the nut 50 unscrewed one turn, whereupon the spool can be moved along the shaft to position the ring over a different groove, the nut tightened and the set screw adjusted to its new position.

Accordingly, a fisherman may carry several spools, each with a different weight line, for his spinning reel, and each spool will include a quick release nut 50 which has been previously adjusted by adjusting the set screw 57 to locate the spool in proper position on the shaft to effect accurate level winding of the line on the spool. Thus, the several spools can be quickly removed and replaced merely by turning the nut one full turn and each spool will always be locked in the same relative position on the shaft. Since the nut always remains with its spool, there are no loose parts to become lost.

Figure 6:
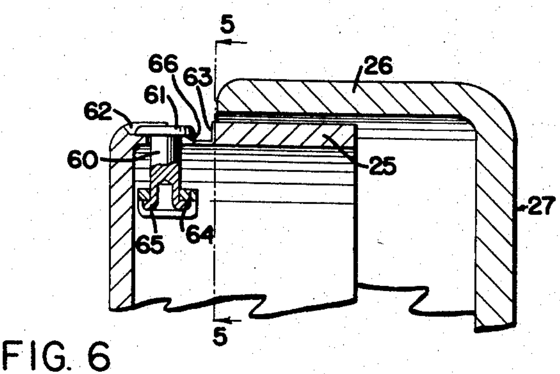
Fig. 6 is a sectional view on line 6—6, Fig. 5.

The novel line fastening device is applied to the inner skirt flange 25 of the spool, and preferably near the inner side of said flange so that it is exposed at all times except when the skirt flange is completely telescoped within the carrier 27 at one end of the reciprocatory stroke of the carrier, which produces the level winding of the line on the spool. As indicated in Fig. 6, the line fastening device includes a rivet 60 slidably mounted in the flange 25, and if the rivet should be covered by the flange 26 of the carrier, a slight turn on the crank handle of the reel will retract the carrier and expose the head 61 of the rivet.

The head 61 of the rivet is seated in a recess 62 in the flange 25, and the recess merges with a groove 63 extending along the inner side of the rivet, the bottom of the groove being substantially tangent to the inner circumference of the skirt flange 25.

The rivet head is yieldingly urged against the bottom of the recess by a flat spring 64 engaged behind the upset flange 65 on the inner end of the rivet 60. Preferably, the spring extends substantially parallel to the groove 63, and its ends resiliently engage the inner circumference of the skirt flange 25.

The bottom surface of the groove 63 is below the bottom surface of the recess 62 and the two surfaces are connected by an inclined surface 66. Thus, when the head 61 of the rivet is seated on the bottom of the recess 62 by the spring, as indicated in Fig. 6, the fishing line can be easily laid in the groove 63 and then drawn upwardly over the inclined surface to engage the line under the rivet head, and prevent the line from unwinding. The tension of spring 64 is such that a lateral pull on the line will release it from the head 61.

It will be seen that the novel line fastening device is adapted for quickly fastening the end of the line which is wound on the spool, to hold the line while the spool is removed from the reel, or when the reel is removed from the rod, or at any time when it is desired to prevent the line from unwinding from the spool. Fastening the line does not require detaching the spool and does not chafe or cut the line.

What is claimed is:

1. A spool construction for a fishing reel comprising a hub and a rear skirt flange, said flange having a recess in its outer periphery, a rivet slidable through said flange and having a head, means within said flange yieldingly seating said head in said recess, and said flange having a groove extending alongside the rivet head and merging with the recess for guiding a portion of fishing line under said head as the line is pulled from said groove toward said head.

2. A spool construction for a fishing reel comprising a hub and a rear skirt flange, said flange having a recess in its outer periphery, a rivet slidable through said flange and having a head, means within said flange yieldingly seating said head in said recess, said flange having a groove extending alongside the rivet head, and a sloping wall connecting the groove with the recess for guiding a portion of fishing line under said head as the line is pulled from said groove toward said head.

3. A spool construction for a fishing reel comprising a hub and a rear skirt flange, said flange having a recess in its outer periphery, a rivet slidable through said flange and having a head, means within said flange yieldingly seating said head in said recess, and said flange having a groove extending alongside and merging with said recess for receiving and guiding a portion of fishing line under said head as the line is pulled toward said head, the bottom of said groove being substantially tangential to the inner circumference of said flange.

4. A spool construction for a fishing reel comprising a hub and a rear skirt flange, said flange having a recess in its outer periphery, a rivet slidable through said flange and having a head, means within said flange yieldingly seating said head in said recess, said flange having a groove the bottom of which extends substantially tangential to the inner circumference of said flange, and an inclined surface connecting said groove and recess for guiding a portion of fishing line from said groove under said head as the line is pulled toward said head.

References Cited in the file of this patent

UNITED STATES PATENTS

| | | |
|---|---|---|
| 2,025,890 | Payne | Dec. 31, 1935 |
| 2,706,096 | Rufle | Apr. 12, 1955 |

FOREIGN PATENTS

| | | |
|---|---|---|
| 961,023 | France | Nov. 14, 1949 |